No. 755,688. PATENTED MAR. 29, 1904.
N. A. McDONALD.
CABINET.
APPLICATION FILED JAN. 2, 1904.
NO MODEL.
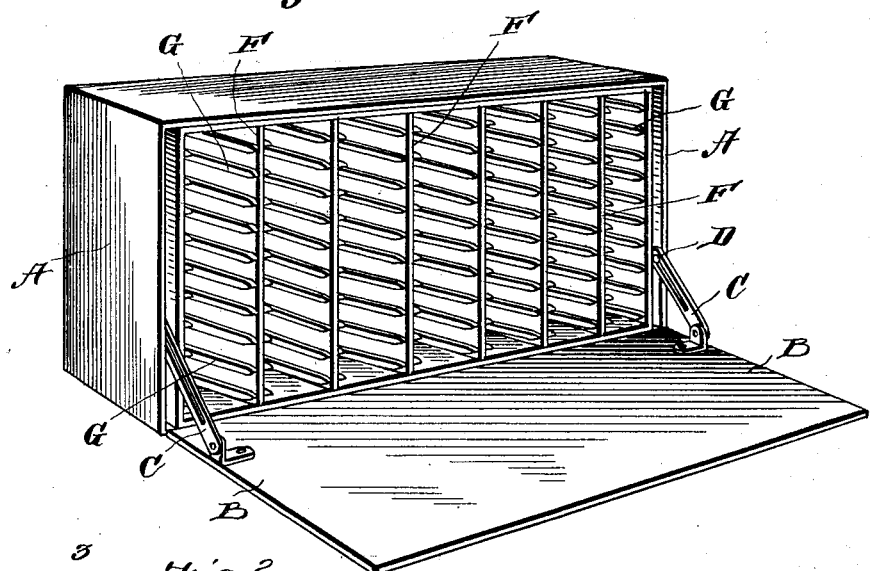
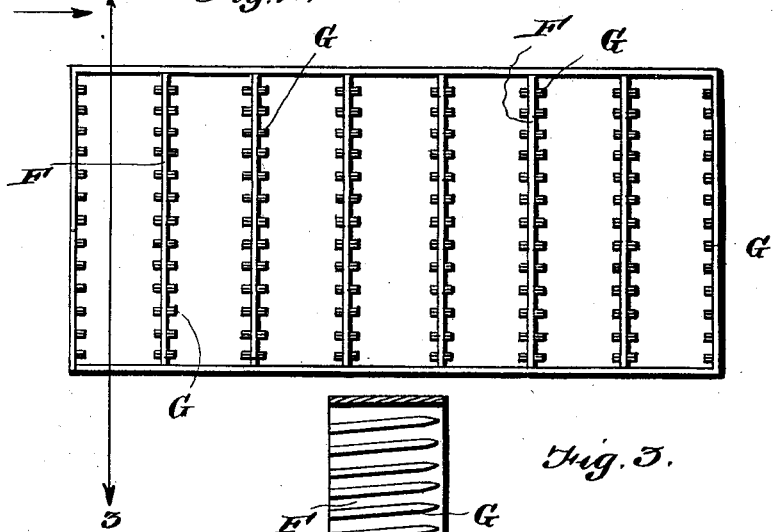
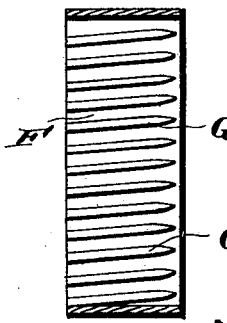

No. 755,688. Patented March 29, 1904.

UNITED STATES PATENT OFFICE.

NORMAN A. McDONALD, OF NEWAYGO, MICHIGAN.

CABINET.

SPECIFICATION forming part of Letters Patent No. 755,688, dated March 29, 1904.

Application filed January 2, 1904. Serial No. 187,548. (No model.)

*To all whom it may concern:*

Be it known that I, NORMAN A. McDONALD, a citizen of the United States, residing at Newaygo, in the county of Newaygo and State of Michigan, have invented certain new and useful Improvements in Cabinets; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in cabinets designed especially for use for holding books; and the object of the invention is to produce a means for holding manifold-books and comprises specifically a box or casing having a lid or turn-down portion adapted to serve as a means of supporting a book or other article and in the provision of a movable rack held within the casing and provided with cleats spaced apart and affording means of support for a manifold-book.

My invention consists, further, in various details of construction and in combinations and arrangements of parts, which will be hereinafter fully described and then specifically defined in the appended claim.

I illustrate my invention in the accompanying drawings, which, with the letters of reference marked thereon, form a part of this application, and in which drawings—

Figure 1 is a perspective view of my improved cabinet, showing one side hinged at the bottom and let down to form a supporting-table. Fig. 2 is a view showing the interchangeable rack removed from the casing. Fig. 3 is a sectional view vertically through the rack, showing in side elevation the shapes of the cleats upon the partition-walls.

Reference now being had to the details of the drawings by letter, A designates a casing which may be of any suitable size or shape and provided, preferably, with a hinged side B, having braces C, which are longitudinally slotted and mounted upon pins D, fastened to the inner faces of the end pieces of the casing, and said pins serve to limit the outer or downward throw of the let-down side of the casing, as shown in the perspective view of the drawings. The removable rack is of such a shape as to conveniently fit the casing, leaving a space at the ends to receive said braces. The rack is provided with a series of partitions F, to which are secured upon opposite faces thereof the cleats G. These cleats G have their forward ends tapering to a point in order to facilitate insertion of blank books, which are adapted to be held by said cleats, and, if preferred, these cleats may be set at a slight inclination to the length of the partitions, if desired, to insure the manifold-books being held more securely therein. The outer edges of the rack and partitions are, when the rack is placed within the casing, a sufficient distance from the outer marginal edge of the casing to allow the let-down side of the casing to close without interference from the rack.

By the provision of a cabinet designed to hold mercantile manifold-books for clerks' use, &c., in accordance with my invention, it will be observed that the rack is made interchangeable and adapted to fit different-sized books, and a convenient article of store-furniture is provided whereby a receptacle is had for manifold-books and means consisting of the let-down side affording a table upon which the book may rest when entries are being made, and when it is desired to lock the casing all of the manifold-books contained in the rack may be held in place by the closed side.

While I have shown a particular construction of apparatus embodying the features of my invention, it will be understood that I may make certain alterations, if desired, in the detailed construction of the device without in any way departing from the spirit of the invention.

Having thus described my invention, what I claim as new, and desire to secure by Letters Patent, is—

A cabinet comprising a casing having a hinged side, braces pivotally connecting said side to the ends of the casing, a removable rack mounted within said casing with spaces intervening between the ends thereof and the ends of said casing, vertical partition-walls to said rack, cleats fastened to the opposite faces of said partitions and disposed at inclinations, the forward ends of the cleats being tapered and spaced back a short distance from the outer marginal edges of said partitions, substantially as shown and described.

In testimony whereof I hereunto affix my signature in presence of two witnesses.

NORMAN A. McDONALD.

Witnesses:
FRANK VAN LEUVEN,
ARCHIE McKINLAY.